United States Patent Office 3,420,502
Patented Jan. 7, 1969

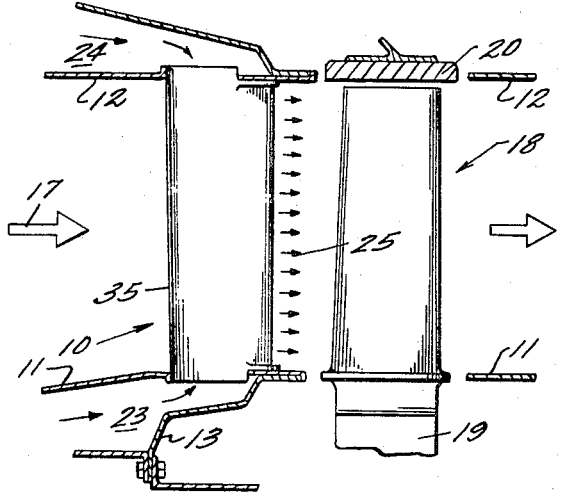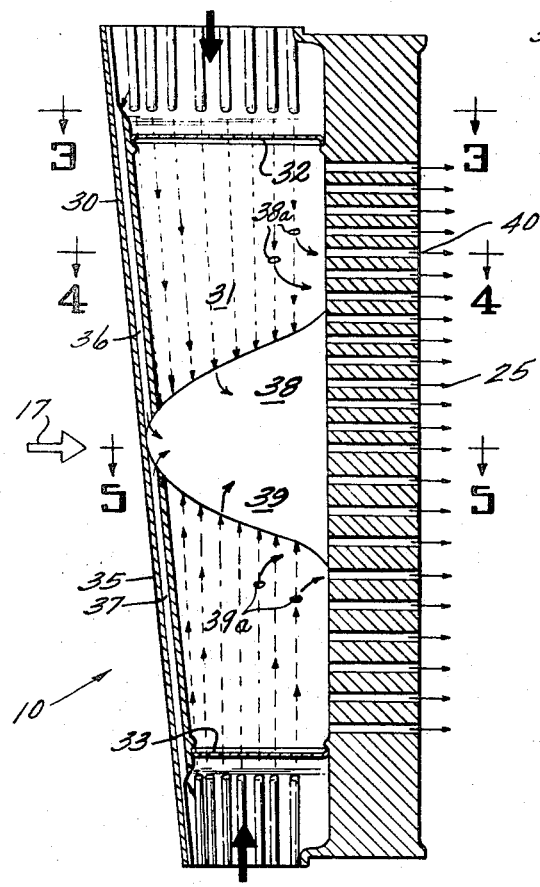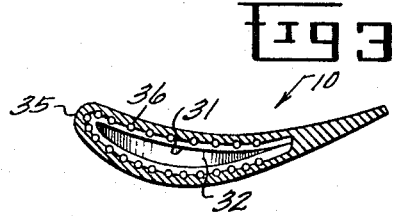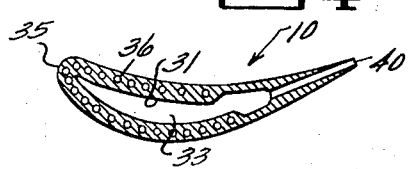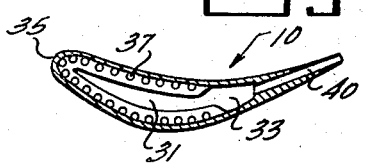

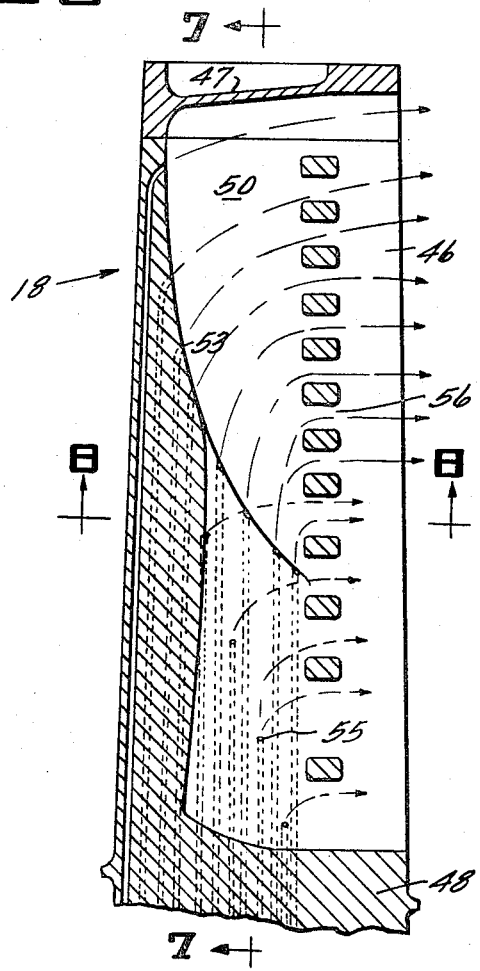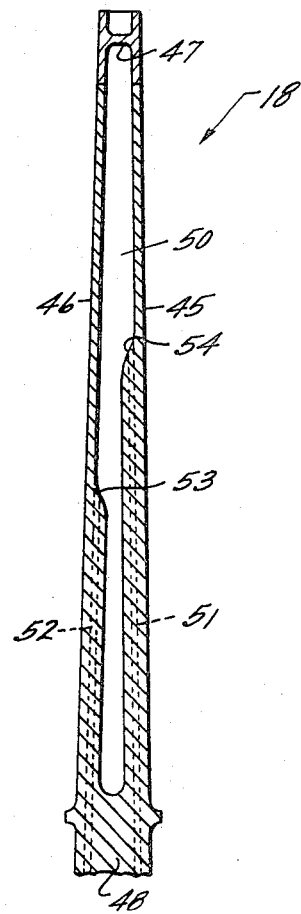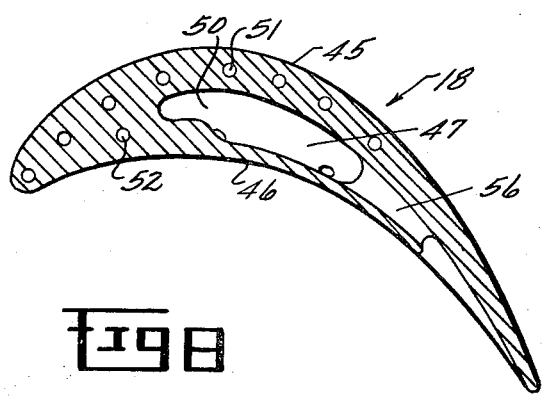

3,420,502
FLUID-COOLED AIRFOIL
Werner E. Howald, Cincinnati, Ohio, assignor to General Electric Company, a corporation of New York
Filed Sept. 4, 1962, Ser. No. 221,660
U.S. Cl. 253—39.1     3 Claims
Int. Cl. F01d 25/12

This invention relates to an airfoil and more particularly to an airfoil construction which provides for efficient fluid cooling for operation in high temperature environments.

In present day turbomachines where the operating temperatures are becoming higher and higher due either to the ram air temperature rise in the compressor, higher performance combustors and turbines or other factors, it has been found necessary to limit the internal temperatures to which the airfoil structure is heated due to the temperature capabilities of the materials being utilized. In order to allow the engine temperatures to be higher, it is therefore necessary to cool the airfoils which are directly exposed to the high temperature gas stream in order to maintain the airfoil structure at a temperature below the critical temperatures of the materials utilized in the structure.

Accordingly, it is the object of the subject invention to provide a specific airfoil structure to allow efficient fluid cooling of the airfoil.

It is another object of this invention to make use of the fluid flow stream within the airfoil in a manner to provide specific cooling advantages to the airfoil.

In accordance with one embodiment of the invention, there is provided a hollow airfoil element having an outer wall defining a cavity extending substantially over the length of the element with end walls closing the cavity at the ends of the airfoil, longitudinally extending fluid passages are provided in the outer wall of the airfoil opening at at least one end of the airfoil and extending into the cavity at various intervals along the airfoil wall, with additional fluid passages leading from the cavity near the trailing edge of the airfoil whereby cooling fluid may be introduced at the airfoil end into the longitudinal passages to cool the airfoil walls and subsequently flow into the cavity and effect turbulent flow within for efficient cooling of the airfoil, to thereafter be exited through the trailing edge passages of the airfoil.

Other objects and many of the attendant advantages of this invention will be readily appreciated as the same becomes better understood by reference to the following detailed description when considered in connection with the accompanying drawings wherein:

FIG. 1 is a side elevation view of the airfoil of the subject invention serving as a stator vane for a turbine, FIG. 2 is a cross sectional view of the airfoil vane showing the cooling fluid passages, FIG. 3 is a cross-sectional view along lines 3—3 of FIG. 2, FIG. 4 is a cross-sectional view along the lines 4—4 of FIG. 2, FIG. 5 is a cross-sectional view along the lines 5—5 of FIG. 2, FIG. 6 is a cross-sectional view of an airfoil blade showing the cooling fluid passages, FIG. 7 is a cross-sectional view along the lines 7—7 of FIG. 6, and FIG. 8 is a cross-sectional view along the lines 8—8 of FIG. 6.

Referring now to FIG. 1 therein is illustrated an airfoil stator vane 10 extending between the cylindrical inner casing member 11 and the cylindrical outer casing member 12 with stator vane supports 13 and 14 utilized to further support the airfoil 10 and others (not shown) extending radially across the annular flow stream 17 formed by the inner and outer casing members. A rotor blade 18 is supported for rotation in the annular flow stream 17 on a rotor wheel 19 (partially shown) with the blade one of many situated for rotation within the annular primary gas stream 17, with an outer sealing member 20 adjacent the outer edge of the rotor blade to limit passage of the primary stream around the outer tip. A second embodiment of the invention for cooling this blade 18 will be explained in detail hereinafter.

It may be seen that the airfoil 10 is subjected to the high temperatures of the primary gas stream 17 making it necessary to cool this vane. To accomplish this cooling, fluid is supplied through one or both of the cooling fluid manifolds 23 and 24 for subsequent flow through the airfoil to convection cool the airfoil and thereafter be emptied into the primary stream as indicated by the arrows 25.

For efficient use of this cooling fluid supplied through the cooling fluid manifolds, the airfoil of the subject invention is constructed as illustrated in the cross-sectional views of FIGS. 2 through 5 comprising an outer wall 30 forming therein a cavity 31 extending substantially over the total length of the airfoil with end walls 32 and 33 closing the ends of the airfoil cavity. These end walls can be made integral with the side walls or may be separate assemblies brazed or otherwise fastened in place for ease of manufacture. As is well known, one of the hottest points of an airfoil subjected to a hot gas stream is the leading edge 35. Therefore the cooling fluid is first led through longitudinally extending passages 36 and 37 for cooling the hot leading edge of the airfoil. By introducing the cooling fluid at this point, the cooling fluid upon its initial introduction to the airfoil is at its coolest temperature and since the leading edge is likely to be the hottest point of the airfoil the primary cooling effect is concentrated at this hottest airfoil portion. Furthermore, by forcing the fluid through these restricted passages 36 and 37 the fluid may be greatly accelerated to sonic or near sonic velocities thereby raising the coefficient of heat transfer of the fluid stream to provide more efficient cooling of the leading edge of the airfoil and by the use of individually formed passages the cooling fluid may contact a maximum airfoil wall area to further increase the cooling efficiency of the system.

After passing through the longitudinally extending passages 36 and 37 the fluid is emptied at various points along the airfoil walls into the cavity 31 of the airfoil as opposing fluid streams 38 and 39. By constructing the individual longitudinal passages of varying lengths the cooling fluid may be distributed throughout the cavity 31 in any desired manner and also where the hottest sections of the airfoil walls occur the passage may be made longer or more numerous for effective cooling. Also, generally laterally directed openings 38a and 39a may be provided for an even further distribution of cooling fluid within the cavity 31. Further, the cooling fluid of the streams exiting from the passages 36 and 37 interacts with the opposing streams to create extreme turbulence within the cavity due to the kinetic energy of the streams to create an eddy flow within the cavity 31. This turbulent flow provides efficient cooling of the cavity and blade wall 30 by providing an excellent mixing of the fluid streams and a highly efficient "wiping" or convection action of the fluid along the walls 30 throughout the length of the cavity.

Thereafter the fluid stream is excited through the trailing edge passages 40 which may extend either through the trailing edge of the airfoil or near the trailing edge for properly cooling trailing edges of the airfoil. In this manner, the cooling fluid is excited from the airfoil tangential to the primary flow to provide the lowest aerodynamic loss to the system possible. Furthermore, the primary flow acts to extract the cooling fluid flow from these trailing edge passages thereby providing an even more efficient flow of cooling fluid through the airfoil.

It will be noted that the trailing edge passages 40 are variably or unevenly spaced along the trailing edge to provide selective cooling of the airfoil. As is well known, the temperature profile of a hot gas stream is generally not constant across the sream but varies due to the various conditions affecting the stream. In the case of turbomachinery of the type herein described, the flow is generally hottest at a point somewhat radially outward from the midpoint of the flow stream. Therefore, the trailing edge passages are concentrated more heavily at this point to provide more cooling at the point of highest temperature. Furthermore, by allowing the longitudinal passages 36 and 37 to empty somewhere near the midpoint of the airfoil in this embodiment greater turbulence is created at this point of highest temperature and therefore greater cooling is provided.

Turning now to FIGS. 6 through 8, another embodiment of the invention is illustrated incorporated in a rotor blade structure such as that illustrated as blade 18 in FIG. 1. In this embodiment where cooling fluid is available at only one end of the airfoil as in all such blade assemblies, the blade 18 comprises outer side walls 45 and 46 which with the end walls 47 and 48 form an internal cooling fluid cavity 50. End wall 48 may include a base portion (not shown) to allow joining the blade to the turbine wheel 19. As in the vane of the first embodiment, the leading edge of the blade is heated to a higher temperature by the hot flow stream 17 to which the blade is subjected therefore longitudinal cooling fluid passages 51 and 52 are provided in the side walls 45 and 46 respectively. Cooling fluid may be supplied to these passages through the turbine wheel 19 in any well-known manner to flow through the blade walls with the same advantageous cooling effects as in the first embodiment and thereafter be emptied into the cavity 50 through the openings 53 and 54. The longitudinal passages are of varying lengths to provide the desired distribution of cooling fluid within the cavity to meet the cooling needs of the blade. Also, additional openings 55 may be provided for a more even distribution of cooling fluid within the cavity 50 near the base of the blade.

From the cavity 50 the cooling fluid is exited from the blade through the trailing edge passages 56 which may be within or near the trailing edge of the blade. It may be noted that these trailing edge passages 56 are of varying sizes to further distribute the flow of cooling fluid in the manner desired to cool the blade walls effectively. Furthermore here again the fluid is exited tangentially to the flow stream 17 with the same advantages as those presented in the first embodiment. Also twith the centrifugal forces acting on the cooling fluid flow through the longitudinal passages as well as the primary gas flow affecting the flow through the trailing edge passages, a highly efficient blade cooling system is provided by this embodiment of the invention.

It may therefore be seen that herein is provided an efficient fluid-cooled airfoil which concentrates the cooling at those points at which it is most needed and which controls the fluid flow in a manner to make full use of the higher coefficients of heat transfer by creating high velocity and turbulent flows for greater cooling efficiencies. While particular embodiments of the invention have been illustrated and described, it will be obvious to those skilled in the art that various changes and modifications may be made without departing from the invention and it is intended to cover in the appended claims all such changes and modifications that come within the true spirit and scope of the invention.

What is claimed as new and desired to be secured by Letters Patent of the United States is:

1. In an axial-flow turbomachine:
   an airfoil having a solid outer wall of substantial thickness, said wall thickness varying from a maximum at the radially spaced airfoil ends to a minimum adjacent the longitudinal center of said airfoil, said wall havng leading and trailing edge portions and defining a central airfoil cavity therewithin;
   a plurality of longitudinally extending cooling fluid passages in the leading edge portion of said wall, the outer ends of said passages being open to the outside of said airfoil at the outer ends thereof to receive a cooling fluid from the outside of said airfoil, the inner ends of said passages opening into said cavity adjacent the longitudinal midpoint of said airfoil with at least one pair of ends of said passages extending from each of the ends of said airfoil being spaced in a directly opposed relationship, wherein the cooling fluid streams from each airfoil end cool said leading edge wall portion and interact to create a turbulent flow in said cavity;
   and a plurality of generally axially extending, radially spaced trailing edge passages extending from said cavity through the trailing edge wall portion to discharge the cooling fluid stream in said cavity therefrom.

2. A turbomachine airfoil as defined in claim 1 wherein the spacing of the pairs of opposed inner ends of said longitudinal passages increases in a direction proceeding from the leading edge toward the trailing edge portion of said outer wall.

3. A turbomachine airfoil as defined in claim 1 wherein the radial spacing of the passages of said trailing edge portion is decreased radially outward of said airfoil longitudinal center so as to increase the cooling effect of said fluid thereat.

References Cited

UNITED STATES PATENTS

| 2,625,793 | 1/1953 | Mierley et al. | 253—39.1 |
| 2,647,368 | 8/1953 | Triebbnigg et al. | 253—39.15 |
| 2,800,273 | 7/1957 | Wheatley et al. | 230—132 |
| 2,956,773 | 10/1960 | French | 253—39.15 |
| 3,017,159 | 1/1962 | Foster et al. | 253—39.15 |
| 3,057,597 | 10/1962 | Meyer et al. | 253—39.15 |
| 2,823,894 | 2/1958 | Gerdan et al. | 253—39.15 |
| 2,847,185 | 8/1958 | Petrie et al. | 253—39.1 |
| 3,014,693 | 12/1961 | Horne | 253—39.1 |
| 3,111,302 | 11/1963 | Bowmer | 253—39.15 |

SAMUEL W. ENGLE, *Primary Examiner.*